United States Patent [19]

Negishi et al.

[11] Patent Number: 5,525,958
[45] Date of Patent: Jun. 11, 1996

[54] ELECTRONIC APPOINTMENT ORGANIZER WITH PAPER PAD FOR PROVIDING HANDWRITTEN INFORMATION CORRELATED TO APPOINTMENTS

[75] Inventors: Hidetaka Negishi, Machida, Japan; Julio E. Valella, Dallas, Tex.

[73] Assignee: Texas Instruments Incorporated, Dallas, Tex.

[21] Appl. No.: 99,895

[22] Filed: Jul. 30, 1993

[51] Int. Cl.[6] .............................. G08B 1/00; G04B 45/00; G04B 47/00
[52] U.S. Cl. .......................... 340/309.15; 368/41
[58] Field of Search .................... 340/309.15, 309.3, 340/309.4, 384.71; 364/705.06, 705.07, 918, 918.9; 368/10, 41, 43, 72, 73, 82, 243, 244, 246, 250, 251

[56] References Cited

U.S. PATENT DOCUMENTS

| | | | |
|---|---|---|---|
| 4,117,542 | 9/1978 | Klausner et al. | 364/705.05 |
| 4,162,610 | 7/1979 | Levine | 368/41 |
| 4,548,510 | 10/1985 | Levine | 368/10 |
| 4,831,562 | 5/1989 | McIntosh et al. | 340/309.15 |
| 4,868,800 | 9/1989 | Arber | 368/41 |
| 5,220,540 | 6/1993 | Nishida et al. | 368/41 |
| 5,289,157 | 2/1994 | Rudick et al. | 340/309.15 |

*Primary Examiner*—Victor R. Kostak
*Assistant Examiner*—John W. Miller
*Attorney, Agent, or Firm*—William E. Hiller; Richard L. Donaldson

[57] ABSTRACT

An appointment reminder (10) includes a display (12) for displaying one or more appointment identifiers (14), the time of day, and the day of week. A keyboard (17) has an appointment key for initiating an appointment setting program and set keys (16) for setting an appointment time. A processor (18) is included for executing the appointment setting program which associates the appointment time with an appointment identifier (14). The processor (18) also executes an appointment notice program that notifies a user when the appointment time has arrived. A memory (21) is included for storing the appointment time, the appointment identifier (14), the appointment setting program and the appointment notice program. A clock (20) provides timing for the operation of the processor (18).

11 Claims, 5 Drawing Sheets

ELECTRONIC APPOINTMENT ORGANIZER WITH PAPER PAD FOR PROVIDING HANDWRITTEN INFORMATION CORRELATED TO APPOINTMENTS

TECHNICAL FIELD OF THE INVENTION

The present invention relates generally to information recording devices and more specifically relates to devices for organizing and signalling of appointments.

BACKGROUND OF THE INVENTION

An appointment organizer is a device which is used to remind one of an appointment prior to its occurrence and to store specific information regarding the appointment. Such information may include the place and subject matter of the appointment.

A typical appointment organizer has two main components. The first component, an appointment reminder, is a timer in which the appointment time is stored. When the appointment time arrives, an alarm is activated to remind one of the appointment. The second component, a storage media, is used to store the specifics of the appointment. Therefore, when the alarm is activated, one can look in the storage medium to determine the specifics of the particular appointment whose time will shortly arrive. There must, however, be some correlation between the appointment whose time is stored in the appointment reminder and the portion of the storage medium in which specific information has been stored for the appointment.

One such correlation scheme currently used is manually indexing portions of the storage medium by month, day and time of day. A problem with the manual indexing scheme is that a voluminous storage medium must be used having enough portions to accommodate any possible appointment month, day and time of day. Such a medium has many portions which are never used since no appointments are scheduled for the corresponding index time.

A second problem with the manual indexing scheme is that the storage medium is typically a ledger divided into days and times of the day. It is time inefficient to search in the ledger for the appointment specifics.

A third problem with the manual indexing scheme is that deleting the appointment specifics typically requires a messy erasure.

A second correlation scheme consists of storing the appointment specifics in electronic memory, and displaying them on a display when the alarm is activated. A problem with the electronic memory scheme is that an appointment organizer having such memory to store appointment specifics is prohibitively expensive.

A problem with both the manual indexing and electronic storage schemes is that neither is compatible with the convenient recording of appointment specific information on a plain sheet from a pad of paper.

SUMMARY OF THE INVENTION

In accordance with the present invention, an appointment reminder is provided. The appointment reminder includes a display for displaying one or more appointment identifiers, the time of day, and the day of week. A keyboard has an appointment key for initiating an appointment setting program and set keys for setting an appointment time. A processor is included for executing the appointment setting program which associates the appointment time with an appointment identifier. The processor also executes an appointment notice program that notifies a user when the appointment time has arrived. A memory is included for storing the appointment time, the appointment identifier, the appointment setting program and the appointment notice program. A clock provides timing for the operation of the processor.

A technical advantage of the present invention is that it is inexpensive, easy to use, and has an efficient appointment time-appointment specifics correlation scheme. This correlation scheme is compatible with the convenient recording of appointment specifics on a plain sheet of paper. Furthermore, dual storage of the appointment time is not required. Stored appointment specifics can be readily and cleanly deleted. No portion of a storage medium must be left unused.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1–10 of the drawings, like numerals being used for like and corresponding parts of the various drawings.

Figure 1:
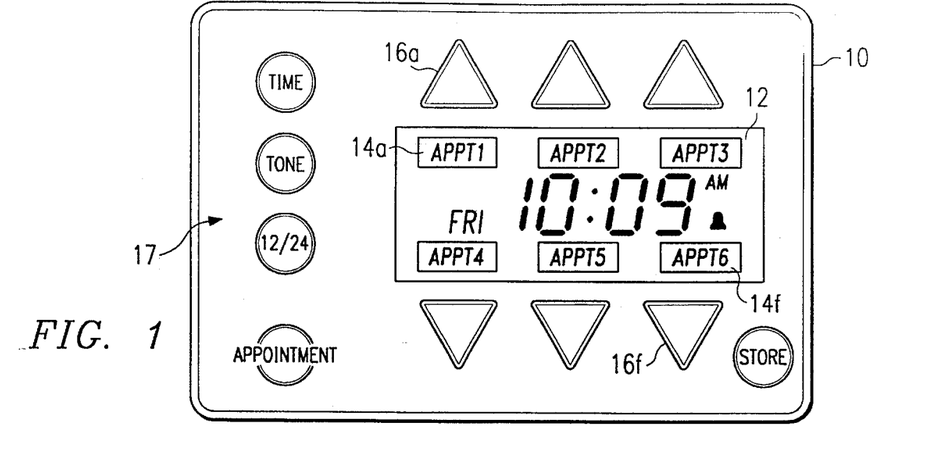
FIG. 1 is one embodiment of an electronic appointment reminder.

FIG. 1 shows an appointment reminder 10. In this particular embodiment, appointment reminder 10 is a digital electronic timer. Appointment reminder 10 may take other forms, however, such as an analog timer. Appointment reminder 10 includes a display 12 for displaying the present time, the present day and a plurality of appointment identifiers 14a–f. Appointment reminder 10 also includes a "TIME" key for setting the time, a "TONE" key for enabling and disabling a key press tone and a "12/24" key for toggling the time display between a 12-hour and a military-style display. An "APPOINTMENT" key is included for initiating an appointment setting program for setting an appointment time corresponding to one of the identifiers 14. A "STORE" key is included for permanently storing the appointment time in a memory 15 (FIG. 3) The "TIME", "TONE", "12/24", "APPOINTMENT", "STORE" keys and set keys 16 are collectively referred to as the keyboard 17 (FIG. 3).

An appointment identifier 14 is only displayed on display 12 when an appointment time is being set or has been stored corresponding to that specific identifier. For example, identifier 14a, which is "APPT1", is only displayed if a specific appointment time is being set or has been stored corresponding to identifier 14a. (The "1" of "APPT1" is an appointment identifier reference number which will be discussed further in conjunction with FIGS. 9 and 10). An appointment time is set for a specific appointment identifier 14 by using the appropriate set key 16. For instance, one would push key 16a to set an appointment time corresponding to "APPT1", i.e., appointment identifier 14a.

Figure 2:
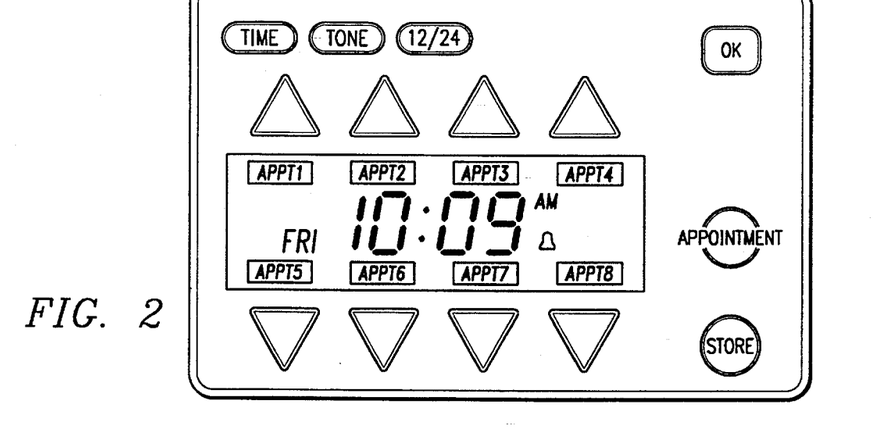
FIG. 2 is another embodiment of the appointment reminder of FIG. 1.

FIG. 2 shows an alternate embodiment of reminder 10 of FIG. 1. The reminder 10 of FIG. 2 allows up to eight appointment times to be set and stored. Otherwise, the operation is very similar to the operation of reminder 10 of FIG. 1.

Figure 3:
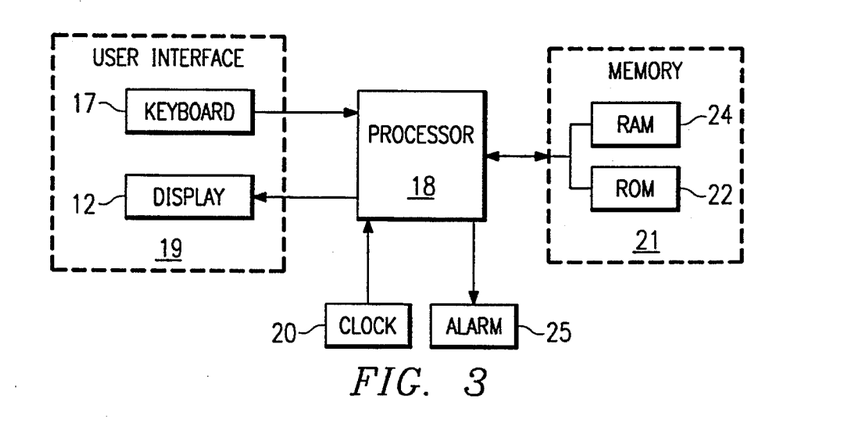
FIG. 3 is a block diagram of the circuitry of the appointment reminders of FIGS. 1 and 2.

FIG. 3 is a block diagram of the circuitry of appointment reminder 10 of both FIGS. 1 and 2. A processor 18 controls the function of reminder 10. In response to commands received from keyboard 17, processor 18 controls display 12 appropriately as will be discussed in more detail below in conjunction with FIGS. 4–9. A clock 20 provides a timing signal to processor 18 and user interface 19, which includes display 12 and keyboard 17. Memory 21 includes a ROM 22 for storing permanent instructions for controlling processor 18, an appointment set and store program, and an appointment notice program. Memory 21 also includes a RAM 24 for providing storage locations for appointment times. An audible alarm 25 is, if enabled, sounded by processor 18 in response to the notice program to indicate the arrival of an appointment time.

The present invention employs appointment identifiers 14 (FIG. 1), discussed in more detail below, which are displayed by appointment reminder 10 when a corresponding appointment time is stored. Identifiers 14 are also used to index the storage medium so that by matching an identifier 14 shown on display 12 with that stored in a storage medium, a user can quickly correlate the proper appointment specific information for that particular appointment with the corresponding appointment time.

FIGS. 4–8 are flow diagrams which show the steps involved in performing specific operations on appointment reminder 10 of FIG. 1. Throughout FIGS. 4–8, the blocks are a representation of what display 12 contains at a particular time. The data which is entered, i.e., the keys of keyboard 17 which are pushed, appear next to the flow lines which interconnect the blocks. Additionally, it is assumed that these steps are performed quickly enough so that the time which is displayed in minutes on display 12 has not incremented to the next minute. However, the operation will not be affected if indeed the steps for performing a function are not performed within a minute. The only difference in FIGS. 4–8 would be that the time, when displayed, would be slightly different, i.e., 5:19 or 5:20 instead of 5:18.

Additionally, an appointment identifier 14 is surrounded by a dotted line to indicate it is blinking on display 12. The colon 57 separating the hour from the minutes on display 12 has lines emanating from the center of each period to indicate that colon 57 is blinking on display 12.

Figure 4:
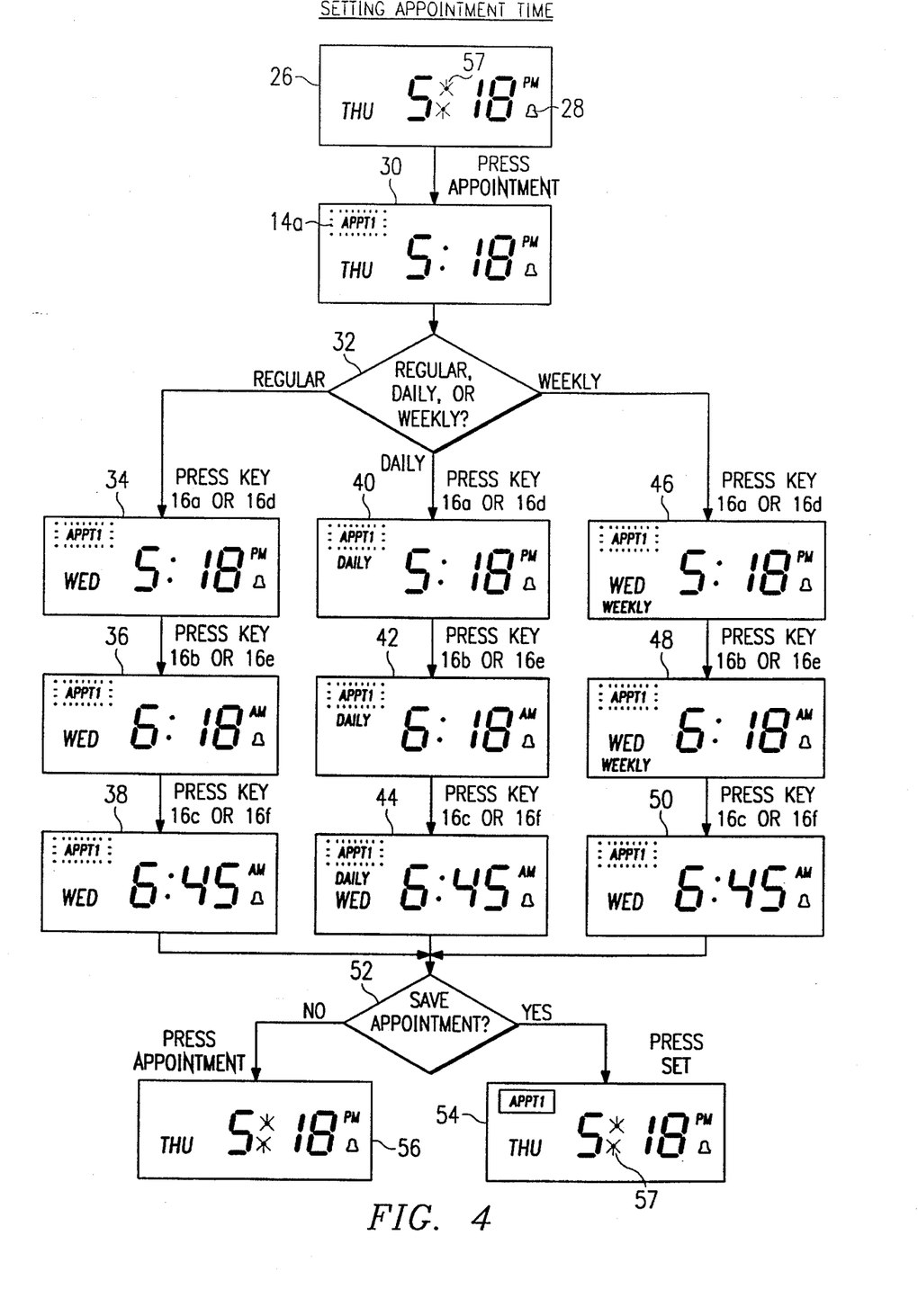
FIG. 4 is a flow diagram outlining the steps for setting, i.e., storing, an appointment time in the appointment reminder of FIG. 1.

More specifically, FIG. 4 shows the steps for setting and storing an appointment time. Block 26 shows the initial state of display 12, which is to display the day, the time (here shown in 12, not 24-hour format) and a bell-shaped indicator 28 for indicating that audible alarm 25 is enabled to sound when any stored appointment time arrives. The "APPOINTMENT" key is pressed to generate the display shown in block 30. The first available appointment identifier 14a ("APPT1"), begins blinking to indicate an appointment time may be set, i.e., an appointment may be entered into memory 21.

Decision block 32 indicates that there are three types of appointments which may be set. The first type is a "Regular" appointment, which is a one-time appointment such as May 26, 1993, at 10:00 p.m. The second type of appointment is a "Daily" appointment, which means that at a specific time each day, the appointment time occurs. For example, one may have a morning meeting which occurs daily at 9:00 a.m. The third type of appointment is a "Weekly" appointment where, at the same day and time each week, an appointment occurs. For example, one may have a weekly meeting on Wednesdays at 2:00 p.m.

To set a "Regular" appointment, the "REGULAR" path is followed and either key 16a or 16d, i.e., either of the keys above or below the portion of display 12 which displays the day of the week, is pressed until the appropriate day of the appointment appears. Block 34 shows display 12 when the appointment day is a Wednesday. Next, key 16b or 16c, i.e., the key above or below the portion of display 12 which displays the hour, is pressed to set the hour of the appointment, shown in block 36 to be 6:00 a.m. Next, either key 16c or 16f is pressed to set the appropriate minute of the appointment, which is setable in increments of five minutes, and is shown to be 45 in block 38.

A "daily" appointment is set as shown by the "DAILY" path. Either key 16a or 16d is pressed until the word "DAILY" appears beneath identifier 14a. Next, either key 16b or 16e is pressed to set the hour of the appointment, shown as 6:00 a.m. in block 42. Key 16c or 16f is then pressed to set the appropriate minute of the appointment time, in integrals of five minutes, which is shown to be 45 in block 44.

The "WEEKLY" path illustrates the steps required to set a "Weekly" appointment time. Either key 16a or 16d is pressed to select the appointment day, with the word "WEEKLY" appearing beneath the appointment day, shown as Wednesday in block 46. Next, either key 16b or 16e is pressed to set the hour of the appointment, here shown in block 48 as 6:00 a.m. Then, either key 16c or 16f is pressed to set the appropriate minute of the appointment time, in increments of 5 minutes, shown to be 45 in block 50.

After the appointment time has been entered into memory 21 according to either path "REGULAR", "DAILY" or "WEEKLY", a decision must be made as to whether that appointment time is to be stored permanently. This decision is illustrated in block 52. To store the appointment time permanently in memory 21, the "STORE" key is pressed. Appointment identifier 14a stops blinking and colon 57 resumes blinking as shown in block 54. Since bell-shaped indicator 28 is displayed as shown in block 54, audible alarm 25 will sound in addition to a blinking alarm (where appointment indicator 14a blinks), when the appointment time arrives.

To delete the appointment time from memory 21, the "APPOINTMENT" key is pressed and appointment identifier 14a, which was blinking during the setting process, disappears from display 12 as shown in block 56.

Figure 5:
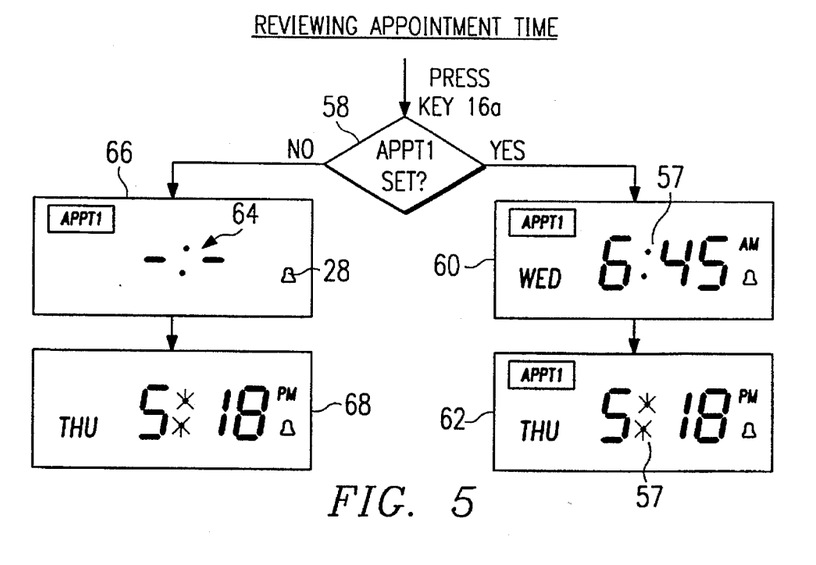
FIG. 5 is a flow diagram outlining the steps for reviewing an appointment time stored in the appointment reminder of FIG. 1.

FIG. 5 is a flow diagram which illustrates the steps for reviewing an appointment time which has already been permanently stored in memory 21 of FIG. 3. Block 54 (FIG. 4) shows the contents of display 12 when an appointment time has been stored for identifier 14a. Block 56 (FIG. 4) shows display 12 when no appointment has been stored for any identifier 14. A key 16 is pressed to review the corresponding identifier 14. For example, key 16a is pressed to review the appointment time stored, if any, corresponding to identifier 14a. If an appointment time has been set for identifier 14a, the "YES" path from decision block 58 is followed; if not, the "NO" path is followed.

If an appointment time has been stored corresponding to identifier 14a, appointment identifier 14a, the day and time are displayed on display 12 for a predetermined period of time as shown in block 60. Then, without the further pressing of any keys, the current day and time return to display 12 as shown in block 62. Notice that in block 60, the colon 57 does not blink, while in block 62, colon 57 does blink.

If no appointment time has been stored corresponding to identifier 14a, display 12 shows identifier 14a and a symbol 64, which resembles a division sign, as shown in block 66. Again, this display of block 66 lasts for a predetermined period of time and then, without further pressing of keys, the current date and time appear as shown in block 68. Notice that appointment identifier 14a is no longer displayed in display 12 because there was no corresponding appointment time stored.

Figure 6:
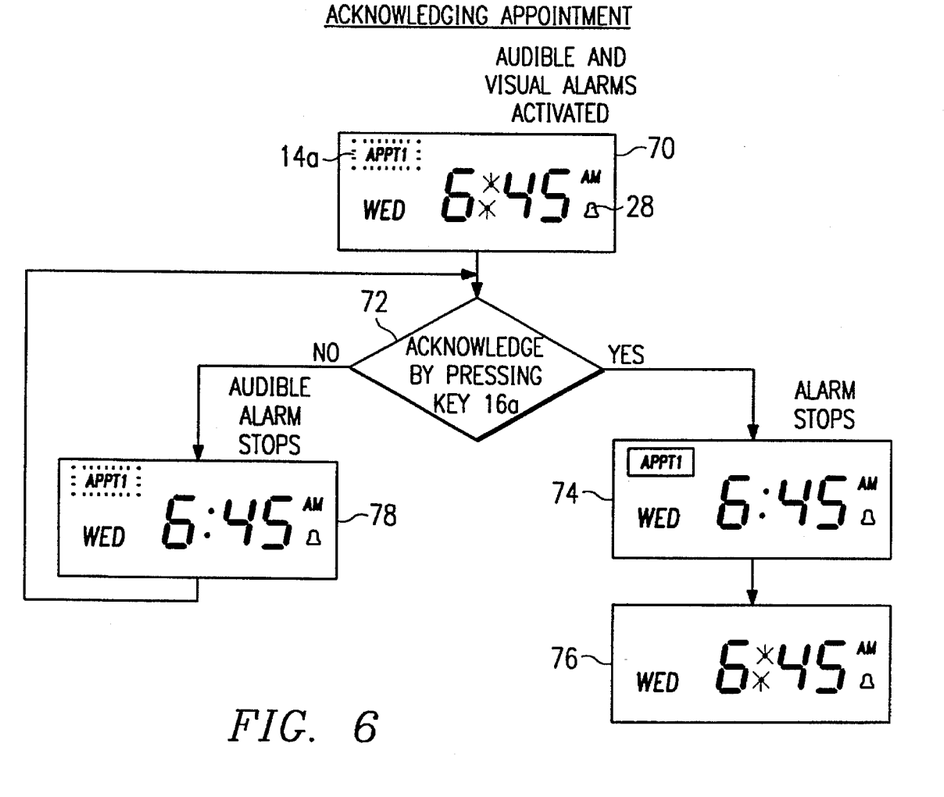
FIG. 6 is a flow diagram outlining the steps for acknowledging the arrival of an appointment time stored in the appointment reminder of FIG. 1.

FIG. 6 is a flow diagram illustrating the steps for acknowledging the arrival of an appointment time. Block 70 shows display 12 when the appointment time, here Wednesday at 6:45 a.m., has arrived. Because bell-shaped indicator 28 is present on display 12, audio alarm 25 will sound and accompany the visual alarm, i.e., the blinking of appointment identifier 14a. The arrival of the appointment time is acknowledged by pressing key 16a, which corresponds to blinking appointment identifier 14a. If key 16a is pressed, the "YES" path from decision block 72 is followed. If the appointment arrival is not acknowledged, then the "NO" path is followed.

In this example, when key 16a is pressed, the display appears as shown in block 74. The appointment identifier 14a stops blinking and the appointment time is displayed for a predetermined period of time. After this predetermined time elapses, the current day and time are displayed and appointment identifier 14a is not displayed. Acknowledging the arrival of the appointment deletes the appointment time from memory 21.

If the appointment arrival is not acknowledged, audible alarm 25 stops sounding after a predetermined period of time. However, appointment identifier 14a continues to blink indefinitely, as shown in block 78, until the appointment is acknowledged by pressing key 16a. Once the appointment arrival is acknowledged by pressing key 16a, display 12 appears as shown in block 74 with appointment identifier 14a displayed in a nonblinking mode, along with the appointment time. After a predetermined period of time elapses, the current day and time are displayed and appointment identifier 14a is no longer displayed, as shown in block 76. No new appointment time can be set or stored for an appointment identifier 14 whose arrived appointment time has not been acknowledged. That is, no new appointment time can be set or stored corresponding to appointment identifier 14a until such previous appointment time has been acknowledged by pressing key 16a.

Figure 7:
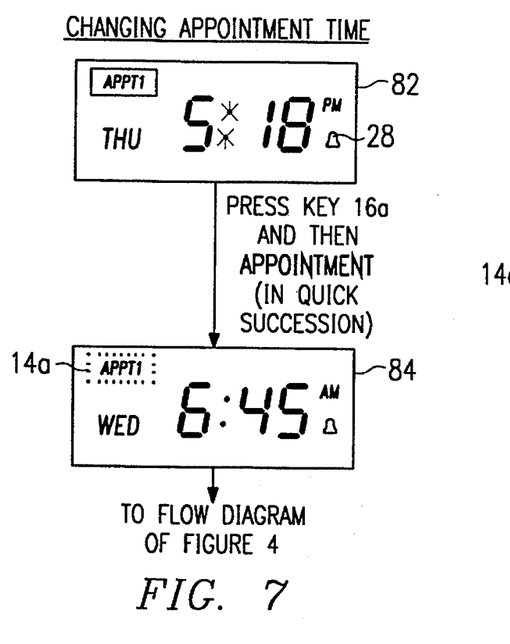
FIG. 7 is a flow diagram outlining the steps for changing an appointment time stored in the appointment reminder of FIG. 1.

FIG. 7 is a flow diagram illustrating the steps for changing a previously stored appointment time assigned to an appointment identifier 14, i.e., deleting a previously stored appointment time and replacing it with another appointment time. Block 82 shows display 12 as it would appear if an appointment time has been stored corresponding to appointment identifier 14a. To change this appointment time, key 16a is pressed and the "APPOINTMENT" key is pressed quickly thereafter. This results in the display as shown in block 84 where identifier 14a blinks. The flow diagram of FIG. 4 (SETTING APPOINTMENT TIME) is followed to set the new appointment time. To retain the original appointment time after key 16a and the "APPOINTMENT" key are pressed in quick succession, either the "APPOINTMENT" key or the "STORE" key is pressed.

Figure 8:
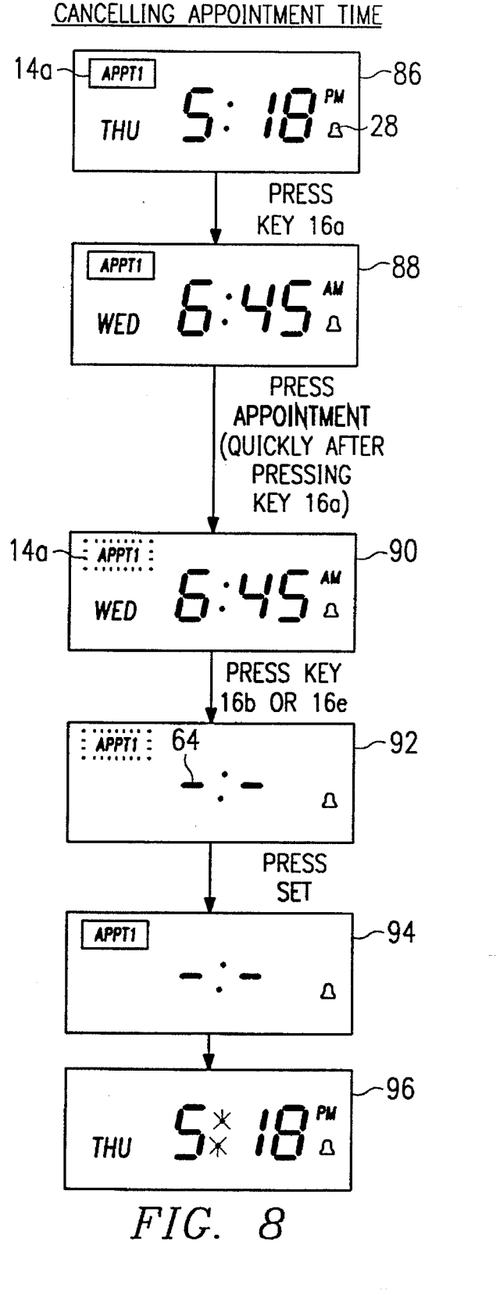
FIG. 8 is a flow diagram outlining the steps for cancelling an appointment time stored in FIG. 1.

FIG. 8 is a flow diagram illustrating the procedure for cancelling an appointment time which has previously been stored in memory 21. Block 86 shows display 12 when an appointment time has been stored corresponding to appointment identifier 14a. Key 16a is pressed, generating the display as shown in block 88, where appointment identifier 14a and the appointment time are shown. Quickly thereafter, the "APPOINTMENT" key is pressed to give the display as shown in block 90. Appointment identifier 14a begins to blink, and the appointment time to be cancelled is displayed.

Next, either key 16b or 16c, i.e., either of the keys 16 in vertical alignment with the hour portion of display 12, is pressed until the "no appointment" symbol 64 appears on display 12 as shown in block 92. "No appointment" symbol 64 is displayed between the hours 11:00 p.m. and 12:00 a.m. The "STORE" key is then pressed to give the display as shown in block 94 where appointment identifier 14a ceases to blink. After a predetermined period of time, display 12 appears as shown in block 96 with appointment identifier 14a no longer displayed.

Figure 9:
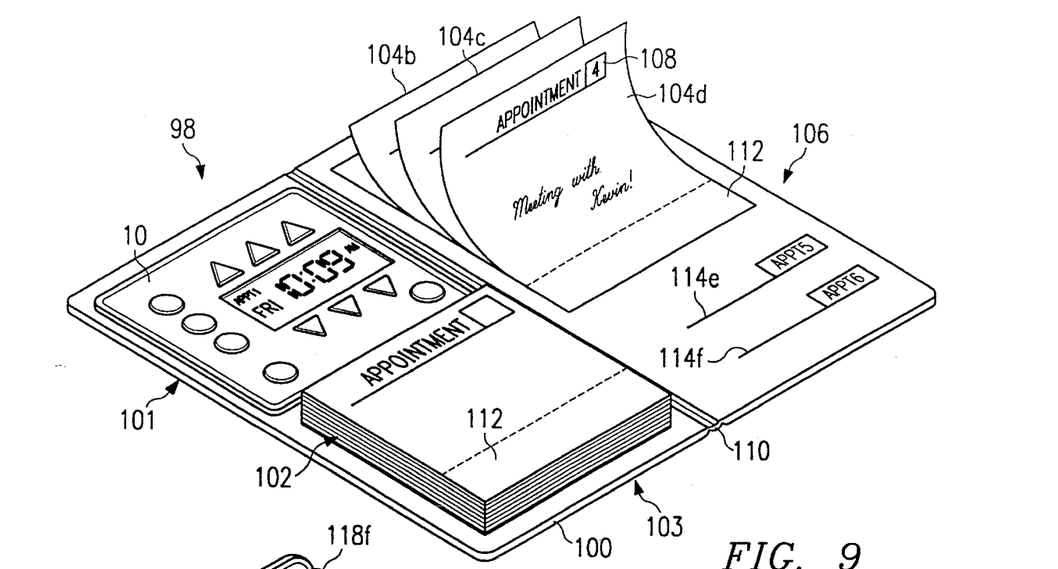
FIG. 9 is one embodiment of an appointment organizer.

FIG. 9 illustrates one embodiment of an appointment organizer 98. Appointment organizer 98 includes a wallet 100 having a holding section 101 for holding an appointment reminder 10 (here shown as the appointment reminder 10 of FIG. 1), a holding section 103 for holding a pad 102 of a self-adhesive storage medium 104 and a holding section 106 for holding storage medium 104 which stores appointment specific information corresponding to specific appointment identifier references stored in square 108. A flexible hinge 110 for allows wallet 100 to be folded in half for easy portability, such as in a shirt pocket.

Each storage medium 104 of pad 102 has a self-adhesive portion 112 at an end opposite from an end on which is located the word "APPOINTMENT" followed by square 108 for receiving a specific appointment identifier reference number, shown as "4" in FIG. 9. In one embodiment, pad 102 is a pad of Post-It™ Notes manufactured by 3M Corporation.

In operation, an appointment time corresponding to a specific appointment identifier 14 is stored in memory 21 as described above. Appointment specific information is then written on the outermost self-adhesive storage medium 104 of pad 102. In block 108 of this outermost storage medium, the appropriate identifier reference is entered corresponding to the appointment identifier 14 assigned to the stored appointment time. For example, if the appointment identifier is 14a, the number "1" is written in block 108.

This outermost storage media 104 is removed from the pad 102 and affixed to section 106 aligned with orientation line 114a (not shown). The appointment identifier number on each storage medium 104 remains clearly visible. The user need only flip through to the storage medium 104 of section 106 having the desired appointment identifier number to read the appointment specific information corresponding to the desired appointment identifier 14.

When the appointment time arrives, audible alarm 25 will sound (if the bell shaped indicator 18 is present on display 12) and the appropriate appointment identifier 14 will begin to blink, indicating which appointment has arrived. The user then looks at the storage media 104 with the corresponding appointment identifier reference written on it to determine the appointment specific information necessary for him to prepare for the appointment. After the appointment time has arrived or has been cancelled, the storage medium 104 containing the corresponding appointment specific information can be peeled off storage section 106.

As described above, appointment organizer 98 of FIG. 9 allows easy storage and removal of appointment specific information. All of the storage media 104 of pad 102 are used in the described way. No storage medium 104 need be "wasted", i.e., go unused.

Figure 10:
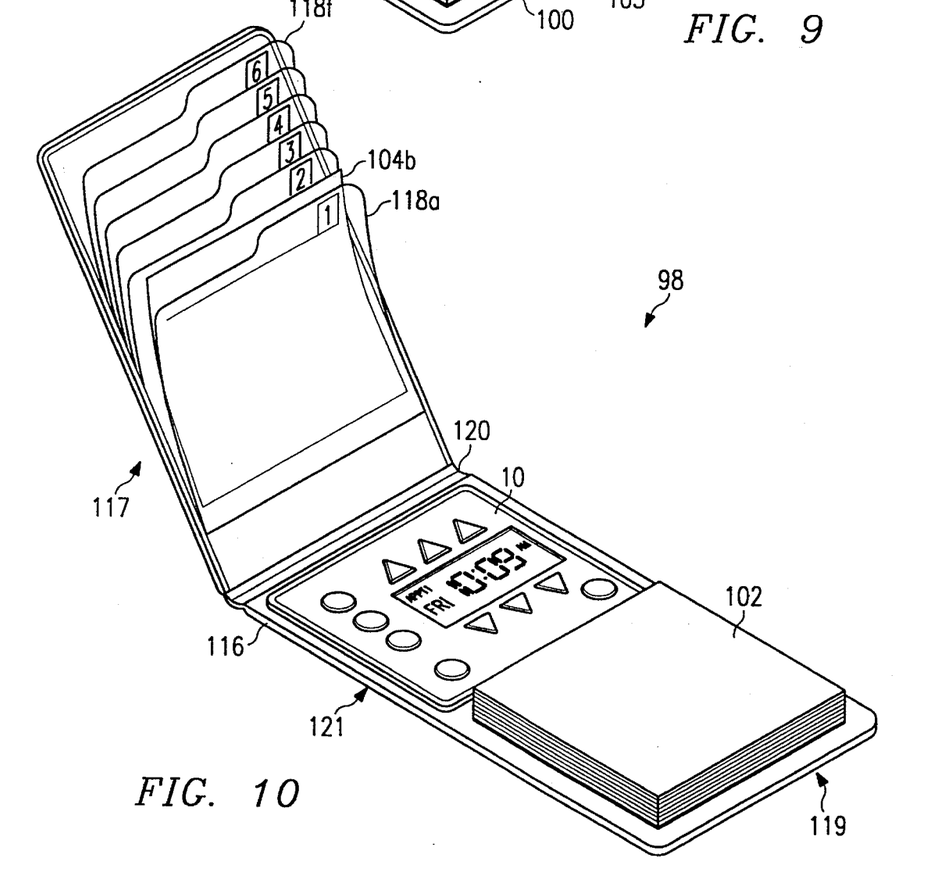
FIG. 10 is another embodiment of the appointment organizer of FIG. 9.

FIG. 10 shows a second embodiment of appointment organizer 98. This embodiment includes a wallet 116 having sections 119, 121 and 117 respectively for holding appointment reminder 10, pad 102 and storage medium 104. These sections are laid out differently than in FIG. 9. However, the function of organizer 98 in FIG. 10 is virtually identical to that of organizer 98 of FIG. 9.

In the FIG. 10 embodiment, however, the storage section laminate sheets 118a–f are marked with numbers, here shown as "1" through "6" which correspond to the appointment identifiers 14a–f for which a corresponding appointment time can be stored in memory 21 of appointment reminder 10. The appointment specific information is recorded on a storage medium 104 which is then adhered to the appropriate laminate sheet 118. Having the appointment identifier number on each laminate sheet 118 alleviates the need to record an appointment identifier reference number on storage medium 104.

Wallet 116 has a flexible hinge 120 so that appointment organizer 98 of FIG. 10 may be folded for convenient carrying in a shirt pocket. The operation of the appointment organizer 98 of FIG. 10 is otherwise the same as that of appointment organizer 98 of FIG. 9.

Although the present invention and its advantages have been described in detail, it should be understood that various changes, substitutions and alterations can be made herein without departing from the spirit and scope of the invention as defined by the appended claims. For example, wallets 100 and 116 may be made from a variety of materials, such as vinyl or leather. Additionally, storage sections 106 and 117 may accommodate more or less than six individual storage media 104. Also, a different appointment reminder, such as reminder 10 of FIG. 2, may be substituted for the reminder 10 shown in FIGS. 9 and 10.

What is claimed is:

1. An appointment reminder comprising:

a memory having memory storage locations in which data representative of an appointment setting program and data representative of an appointment notice program are stored;

a processor operably coupled to said memory for accessing data representative of the appointment setting program and the appointment notice program;

display means for displaying the time of day, and the day of week and having a plurality of display fields on which respective appointment identifiers are displayed, said display means being operably coupled to said processor;

a keyboard operably coupled to said processor and having a plurality of manually actuatable keys provided thereon, said plurality of keys including a single designated appointment key and a plurality of set keys, said plurality of set keys being individually selectively actuatable;

said processor being responsive to the actuation of said appointment key to access data from said memory initiating an appointment setting program;

said processor also being responsive to the actuation of a particular set key for executing the appointment setting program to set a particular appointment time associated with said particular set key;

said display means being responsive to the execution of said appointment setting program by said processor for visually highlighting an appointment identifier in one of said plurality of display fields as a visual display on the display means associated with said particular set key and the particular appointment time associated therewith;

a clock coupled to said processor for timing the operation of said processor;

said processor being responsive to the arrival of the particular appointment time associated with the highlighted visually displayed one of said appointment identifiers on said display means for accessing data representative of the appointment notice program from said memory and executing the appointment notice program; and means coupled to said processor and responsive to the execution of the appointment notice program by said processor for providing an indication that the appointment time associated with the visually displayed highlighted appointment identifier and the particular set key corresponding thereto has arrived.

2. An appointment reminder as set forth in claim 1, wherein each set key of said plurality of set keys corresponds to a respective one of said plurality of display fields on which respective appointment identifiers are displayed on said display means, each set key being operable to review a particular stored appointment time from data stored in said memory.

3. An appointment reminder as set forth in claim 2, wherein each set key of said plurality of set keys is in registering alignment with a specific display field of said plurality of display fields on which respective appointment identifiers are displayed so as to correspond to a single display field on which an appointment identifier will be visually displayed dependent upon the appointment setting program being executed by said processor.

4. An appointment reminder as set forth in claim 1, wherein said means for providing an indication that the appointment time has arrived comprises an alarm for sounding at the appointment time.

5. An appointment reminder as set forth in claim 1, wherein said means for providing an indication that the appointment time has arrived comprises blink control means included in said display means for causing said one of said appointment identifiers included in one of said plurality of display fields as a visual display to blink "on" and "off" at the appointment time.

6. An appointment reminder as set forth in claim 1, wherein the appointment time is a particular time of day repeated at the same time on a plurality of days.

7. An appointment reminder as set forth in claim 1, wherein the appointment time is a specific time of day for a single specific day over a plurality of weeks.

8. An appointment organizer comprising:

a wallet-like cover having at least first and second holding sections;

an appointment reminder affixed to said first holding section and including a memory having memory storage locations in which data representative of an appointment setting program and data representative of an appointment notice program are stored, a processor operably coupled to said memory for accessing data representative of the appointment setting program and the appointment notice program, display means for displaying the time of day, and the day of week and having a plurality of display fields on which respective appointment identifiers are displayed, said display means being operably coupled to said processor, a keyboard operably coupled to said processor and having a plurality of manually actuatable keys provided thereon, said plurality of keys including a single designated appointment key and a plurality of set keys, said plurality of set keys being individually selectively actuatable, said processor being responsive to the actuation of said appointment key to access data from said memory initiating an appointment setting program, said processor also being responsive to the actuation of a particular set key for executing the appointment setting program to set a particular appointment time associated with said particular set key, said display means being responsive to the execution of said appointment setting program by said processor for visually highlighting an appointment identifier in one of said plurality of display fields as a visual display on the display means associated with said particular set key and the particular appointment time associated therewith, a clock coupled to said processor for timing the operation of said processor, said processor being responsive to the arrival of the particular appointment time associated with the highlighted visually displayed one of said appointment identifiers on said display means for accessing data representative of the appointment notice program from said memory and executing the appointment notice program, and means coupled to said processor and responsive to the execution of the appointment notice program by said processor for providing an indication that the appointment time associated with the visually displayed highlighted appointment identifier and the particular set key corresponding thereto has arrived; and information display means for receiving handwritten inputs indicative of appointment specific information affixed to said second holding section of said wallet-like cover, thereby providing a source of data information for correlation with said appointment setting program and said appointment notice program of said appointment reminder affixed to said first holding section of said wallet-like cover.

9. An appointment organizer as set forth in claim 8, wherein said information display means comprises a pad including a plurality of individual paper sheets for receiving handwritten information thereon.

10. An appointment organizer as set forth in claim 9, wherein each of said paper sheets included in said pad is provided with an adhesive strip on one side thereof;

a respective sheet of said pad being detachable from said pad for adherent placement of the detached sheet on another surface via the adhesive strip thereon.

11. An appointment organizer as set forth in claim 9, wherein said wallet-like cover further includes a third holding section;

a tabular file arrangement including a plurality of individual file folders affixed to the third holding section of said wallet-like cover; and each of said file folders including an indexing tab having a symbol thereon corresponding to a specific one of the appointment identifiers respectively associated with a corresponding one of said plurality of display fields on said display means of said appointment reminder;

each of said file folders of said tabular file arrangement affixed to said third holding section of said wallet-like cover being adapted to receive a sheet detached from said pad having handwritten information thereon related to one of said appointment identifiers.

* * * * *